(12) United States Patent
Mezza et al.

(10) Patent No.: US 12,554,943 B2
(45) Date of Patent: Feb. 17, 2026

(54) SYSTEM AND METHOD FOR ANOMALY DETECTION IN UNLABELED COLLECTIONS OF AUDIO RECORDING

(71) Applicant: Robert Bosch GmbH, Stuttgart (DE)

(72) Inventors: Alessandro Ilic Mezza, Milan (IT); Luca Bondi, Pittsburgh, PA (US); Shabnam Ghaffarzadegan, Livermore, CA (US); Pongtep Angkititrakul, Dublin, CA (US)

(73) Assignee: Robert Bosch GmbH (DE)

( * ) Notice: Subject to any disclaimer, the term of this patent is extended or adjusted under 35 U.S.C. 154(b) by 247 days.

(21) Appl. No.: 18/222,409

(22) Filed: Jul. 14, 2023

(65) Prior Publication Data

US 2025/0021770 A1    Jan. 16, 2025

(51) Int. Cl.
    *G06F 40/51* (2020.01)
(52) U.S. Cl.
    CPC .................................. *G06F 40/51* (2020.01)
(58) Field of Classification Search
    CPC .. G06F 18/214; G06F 17/14; G06F 18/21375; G06F 30/10; G06F 40/51; G06F 18/24155; G06F 17/11; G06F 17/18; G06F 18/213; G06F 18/24; G06F 18/241; G06F 18/24133; G06F 40/30; G06F 18/2415; G06F 40/20; G06F 40/263; G06F 40/47; G06F 40/58; G06F 16/685; G10L 25/30; G10L 25/51; G10L 25/06; G10L 25/27; G10L 15/063; G10L 15/16; G10L 17/02; G10L 25/18; G10L 17/04; G10L 15/08; G10L 15/183; G10L 15/18
    See application file for complete search history.

(56) References Cited

U.S. PATENT DOCUMENTS

| | | | |
|---|---|---|---|
| 11,501,102 B2* | 11/2022 | Salamon | G10L 25/51 |
| 2020/0349921 A1* | 11/2020 | Jansen | G10L 25/51 |
| 2021/0350135 A1* | 11/2021 | Salamon | G06F 18/217 |
| 2022/0115030 A1* | 4/2022 | Wang | G10L 21/02 |

(Continued)

OTHER PUBLICATIONS

Kaori Suefusa et al. "Anomalous Sound Detection Based on Interpolation Deep Neural Network." arXiv:2005.09234v1 [eess.AS] May 19, 2020, 5 Pages.

(Continued)

*Primary Examiner* — Abdelali Serrou
(74) *Attorney, Agent, or Firm* — Dickinson Wright PLLC

(57) ABSTRACT

In some implementations, the device may include receiving a first and second audio dataset. In addition, the device may generate a first, a second, a third, and a fourth audio sample. Moreover, the device may include determining a level of similarity between the first and second audio samples. Also, the device may include combining the first and second audio samples into an audio pair. Further, the device may include training a machine learning model to map audio samples to a latent space visualization in view of time and the similarities between the first and second audio samples to yield a trained machine learning model. In addition, the device may include mapping, by the machine learning model, in the latent space visualization, the third and fourth audio samples, where placement of the third and fourth audio samples depends on the level of similarity between the third and fourth audio samples.

20 Claims, 10 Drawing Sheets

(56) References Cited

U.S. PATENT DOCUMENTS

| | | | | |
|---|---|---|---|---|
| 2023/0178082 A1* | 6/2023 | Wei | ......................... | G10L 17/18 |
| | | | | 704/232 |
| 2024/0257496 A1* | 8/2024 | Jenni | ..................... | G06F 18/214 |
| 2024/0341715 A1* | 10/2024 | Xue | ........................ | G10L 25/66 |

OTHER PUBLICATIONS

Aaqib Saeed et al. "Contrastive Learning of General-Purpose Audio Representations." arXiv:2010.10915v1 [cs.SD] Oct. 21, 2020, 5 Pages.

Alec Radford et al. "Learning Transferable Visual Models From Natural Language Supervision." arXiv:2103.00020v1 [cs:CV] Feb. 26, 2021, 48 Pages.

Yuma Koizumi et al. "Description and Discussion on DCASE2020 Challenge Task2: Unsupervised Anomalous Sound Detection for Machine Condition Monitoring." arXiv:2006.05822v2 [eess.AS] Aug. 8, 2020, 5 Pages.

Yohei Kawaguchi et al. "Description and Discussion on DCASE 2021 Challenge Task 2: Unsupervised Anomalous Sound Detection for Machine Condition Monitoring Under Domain Shifted Conditions." arXiv:2106.04492v2 [eess.AS] Sep. 27, 2021, 5 Pages.

Martin Ester et al. "A Density-Based Algorithm for Discovering Clusters in Large Spatial Databases With Noise." Institute for Computer Science, University of Michigan, KDD-96 Proceedings, 6 Pages.

Ting Chen et al. "A Simple Framework for Contrastive Learning of Visual Representations." arXiv:2002.05709v3 [cs.LG] Jul. 1, 2020, 20 Pages.

Mihael Ankerst et al. "OPTICS: Ordering Points to Identify the Clustering Structure." Proc. Acm SIGMOD'99 Int. Conf. on Management of Data, Philadelphia, PA, 1999, 12 Pages.

* cited by examiner

SYSTEM AND METHOD FOR ANOMALY DETECTION IN UNLABELED COLLECTIONS OF AUDIO RECORDING

TECHNICAL FIELD

The present disclosure relates to image processing utilizing a machine learning model for detecting anomalies in audio recordings.

BACKGROUND

In certain settings, anomalous sounds signal may indicate harmful situations and must be identified quickly to avoid adverse consequences. In industrial plants, acoustic anomalies may indicate a failure in machinery or equipment that could have expensive or dangerous outcomes. In video-surveillance applications, acoustic anomalies may represent uncommon or undesirable events, e.g., related to break-ins, vandalism, and violence. Audio monitoring is inexpensive to deploy, and can monitor the condition of an environment or a process without direct visual contact. In practice, however, gathering a large dataset of acoustic anomalies is difficult and costly, as it may entail intentionally breaking several functioning machines or parts just to collect anomalous data. In the case of video-surveillance applications, intentionally generating anomalous events is limiting, and at times unfeasible.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method may include receiving, from a microphone, a first audio dataset and a second audio dataset. The computer-implemented method may also include generating, based on the first audio dataset, a first audio sample and a second audio sample, where each of the first and second audio samples are smaller than the first audio dataset and the first audio sample is distinct from the second audio sample. The method may furthermore include generating, based on the second audio dataset, a third audio sample and a fourth audio sample, where each of the third and fourth audio samples are smaller than the second audio dataset and the third audio sample is distinct from the fourth audio sample. The method may in addition include determining a level of similarity between the first audio sample and the second audio sample. The method may moreover include combining the first audio sample and the second audio sample into an audio pair in response to the level of similarity between the first audio sample and the second audio sample being above a first predetermined threshold. The method may also include training a machine learning model, based on the audio pair, to map audio samples to a latent space visualization in view of time and the similarities between the first audio sample and the second audio sample to yield a trained machine learning model. The method may furthermore include mapping, by the trained machine learning model, in the latent space visualization, the third audio sample and the fourth audio sample where placement of the third audio sample and the fourth audio sample depends on the level of similarity of the third audio sample and the fourth audio sample, as determined by the trained machine learning model. Other embodiments of this aspect include corresponding computer systems, apparatus, and computer programs recorded on one or more computer storage devices, each configured to perform the actions of the methods.

Implementations may include one or more of the following features. A computer-implemented method where the mapping of the third audio sample and the fourth audio sample in the latent space visualization creates a cluster and the method may include: labeling the third audio sample and the fourth audio sample based on a number of clusters in the latent space visualization. The computer-implemented method may include: receiving a fifth audio sample; generating the probability score for the fifth audio sample where the probability score indicates a probability that the fifth audio sample is associated with the cluster; comparing the probability score with a second predetermined threshold; and associating the fifth audio sample with the cluster in response to the probability score being greater than the second predetermined threshold. The computer-implemented method where the first audio sample and the second audio sample do not overlap in view of the first audio dataset. The computer-implemented method where the training of the machine learning model is performed via a self-supervised contrastive learning objectives. The computer-implemented method where the first audio dataset and the second audio dataset do not include human annotations. The computer-implemented method where the mapping of the third audio sample and the fourth audio sample in the latent space visualization creates a cluster and the method may include: determining a shared attribute between the third audio sample and the fourth audio sample; and labeling the cluster based on the shared attributes of the third audio sample and the fourth audio sample.

Implementations of the described techniques may include hardware, a method or process, or a computer tangible medium.

DETAILED DESCRIPTION

Figure 1:
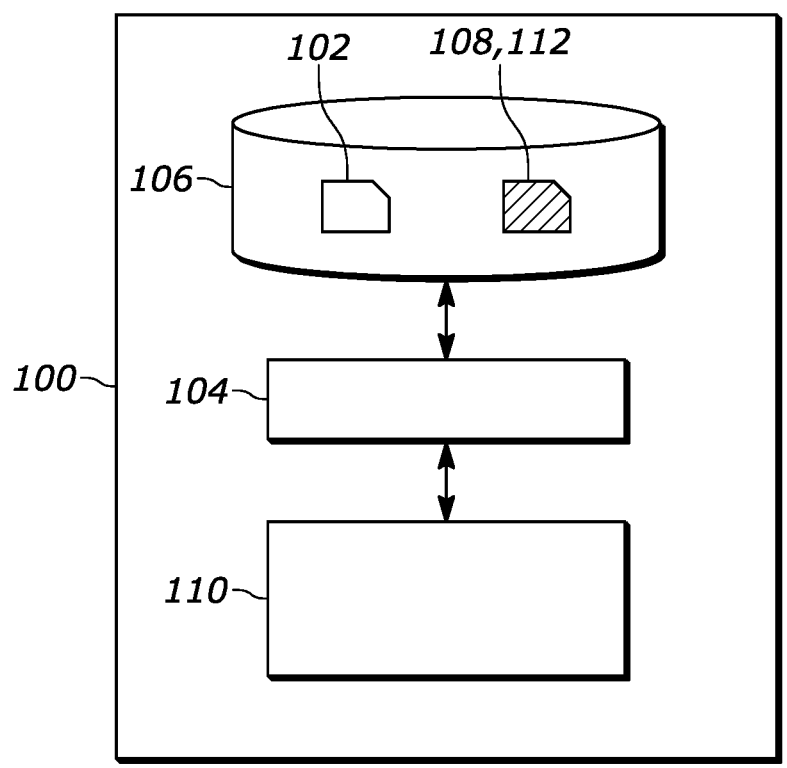
FIG. 1 shows a system for training a neural network, according to the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Contrastive Representation Learning

In this disclosure a method for discovering latent acoustic states by clustering deep audio representations which may be obtained via self-supervised contrastive learning is described. Specifically, self-supervised contrastive learning which may allow for exposure of emerging acoustic event attributes without human interaction. The systems and methods described herein may be configured to embed audio data into a low-dimensional topological space in which recordings characterized by similar attributes may be located close to each other and far away from the others.

The systems and method described here may be configured to utilize a nonlinear projection $f: \mathbb{R}^L \rightarrow \mathbb{R}^M$ which may be parameterized as a neural network that maps a short-time segment of a digital audio signal in $\mathbb{R}^L$ onto a fixed-length real-valued vector in $\mathbb{R}^M$. In particular, the systems and methods described herein may train $f(\cdot)$ via backpropagation using a self-supervised contrastive learning objective.

To learn the nonlinear projection $f: \mathbb{R}^L \rightarrow \mathbb{R}^M$, the systems and methods described herein may be configured to optimize the network parameters which may minimize a normalized temperature-scaled across-entropy (NT-Xent) loss function.

The systems and methods described herein may be configured to select N fixed-length context windows in which the systems and methods described herein may assume temporal invariance for the unknown attributes. The systems and methods described herein may randomly sample two segments (e.g., $x_i$, $x_j$) from within each context window, resulting in a batch of 2N audio clips. The sampling may be performed in the time domain by segmenting raw waveforms. In some embodiments, the two segments taken from the same context window are considered a positive pair, whereas the remaining 2(N−1) segments are assumed to be negative examples. The systems and methods described herein may be configured to feed each pair to $f(\cdot)$ in order to extract the corresponding representations. In this way, the systems and methods described herein may optimize the following contrastive loss function defined on the embeddings $z_1, \ldots z_{2N}$ (or possibly nonlinear projection thereof):

$$\mathcal{L}_{NT-Xent} = -\frac{1}{N} \sum_{i,j} \log \frac{\exp(sim(z_i, z_j)/\tau)}{\sum_{l=1}^{2N} \mathbb{1}_{[l \neq i]} \exp(sim(z_i, z_l)/\tau)}$$

Where $\{i, j\}$ may be the indices of a positive pair. $\mathbb{1}_{[l \neq i]}$ may be an indicator function that may be zero when l=i and one otherwise. Sim $(\cdot, \cdot)$ may be a similarity measure such as cosine similarity, bilinear similarity, or the inverse of a Minkowski distance, and $\tau > 0$ is the softmax temperature controlling the entropy of the logits. The systems and methods described herein may be configured to optimize log $\tau$ along with the neural network parameters to avoid manual tuning.

Density-Based Clustering

The systems and methods described herein may be configured to, after the pre-training of $f(\cdot)$ is completed, utilize vector-valued representations $(z_i, z_j)$ of audio clips exhibiting similar acoustic features which may form non-semantic clusters in the latent space without requiring human supervision. The representations may be clustered through one of the following clustering approaches: centroid-based methods (such as K-Means), distribution-based methods (such as Gaussian Mixture Models), hierarchical methods (such as linkage-based algorithms), or any other appropriate clustering approach. However, these clustering concepts typically entail an ad-hoc interaction with a human expert and/or a prior assumptions regarding the target data distribution. Therefore, the systems and methods described herein may favor density-based approaches (e.g., DBSCAN, OPTICS, or any other appropriate density based clustering approaches) which may not require a pre-defined number of clusters K in advance, may involve minimal hyper-parameter tuning, and may allow for arbitrary-shaped latent distributions.

The systems and methods described herein may be configured to view corresponding cluster indices as annotations of emerging pseudo-attributes, and may be used for various downstream tasks, including, but not limited to, pretext attribute classification. The systems and methods described herein may result in a fully unsupervised pseudo-attribute discovery pipeline that may assign, to each audio clip in a dataset, the corresponding cluster index $k \in \{1, \ldots, K\}$, where K is the total number of clusters identified by the systems and methods described herein.

Outlier Exposure Model Training

The systems and methods described herein may be configured to regard cluster labels as pseudo-attributes in downstream pretext classification tasks. The pretext classifier $\Theta(\bullet)$ may be a neural network of choice that given an audio sample at the input, predicts the probability of such sample belonging to each of the K clusters predicted above. Such a neural network may be trained via backpropagation with a cross-entropy loss, or any suitable supervised classification loss function.

The systems and methods described herein may be configured to, at inference time, utilize audio sample x which may be fed into $\Theta(\bullet)$ and the anomaly score for the sample may be computed as:

$$A(x) = \log \frac{1 - p_k(x)}{p_k(x)}$$

where $p_k(x)$ is the probability of sample x belonging to the kth cluster as predicted by $\Theta(\bullet)$, where k is the cluster index associated to x by the density-based clustering algorithm as described above. Samples with a value of A(x) greater than an application-specified threshold may be identified as anomalous.

FIG. 1 shows a system 100 for training a neural network. The system 100 may comprise an input interface for accessing training data 102 for the neural network, where the training data may be raw audio data. For example, as illustrated in FIG. 1, the input interface may be constituted by a data storage interface 104 which may access the training data 102 from a data storage 106. In some embodiments, the input interface may be constituted by one or more microphones, coupled directly or indirectly to the input interface. In some embodiments, a microphone may be a transducer which converts sounds into electrical signals which may be stored as digital data. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage; and may be referred to as a non-transitory computer-readable medium.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network, this data may also be referred to as trained model data. For example, as also illustrated in FIG. 1, the output interface may be constituted by the data storage interface 104, with said interface being in these embodiments an input/output ('IO') interface, via which the trained model data may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
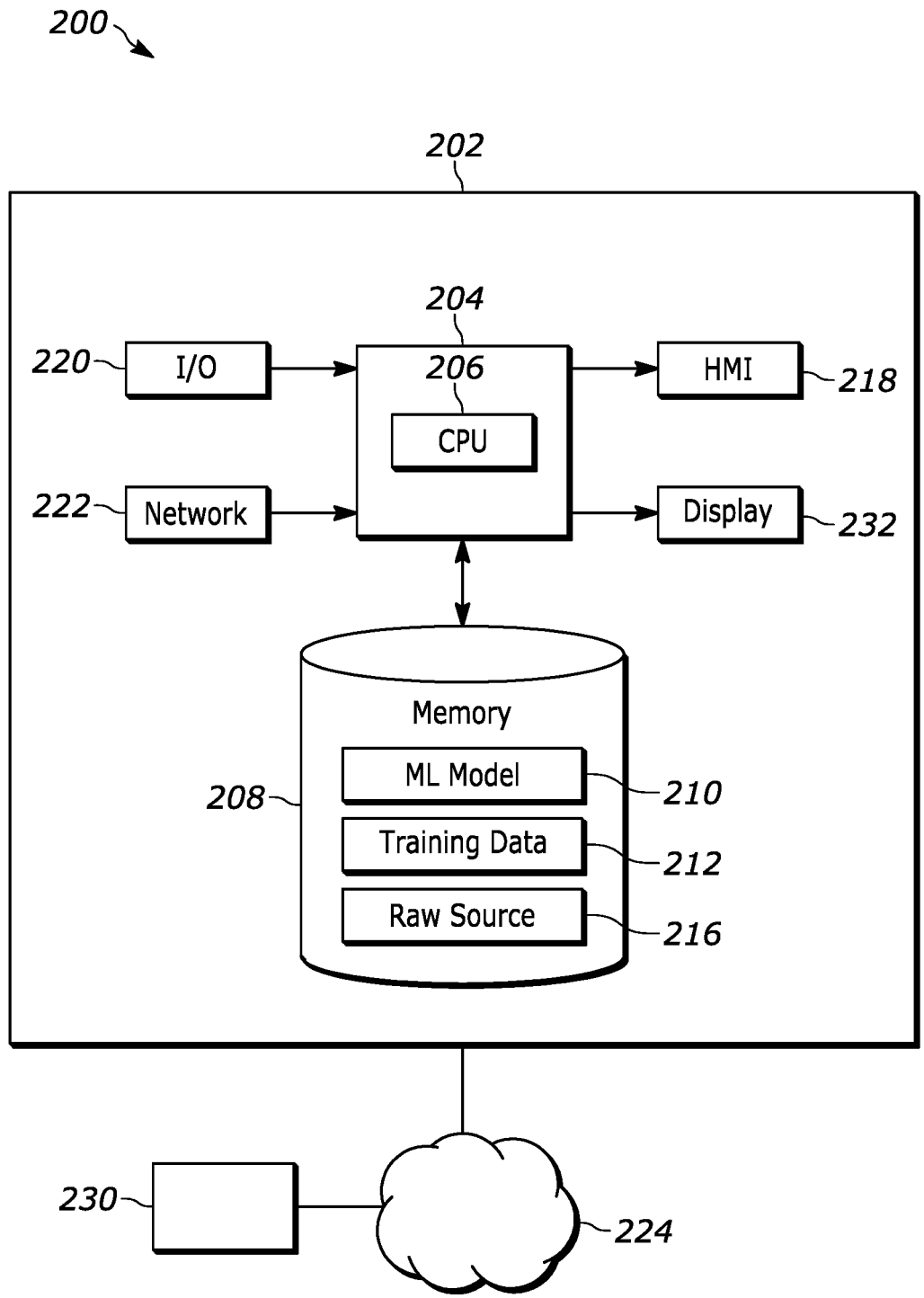
FIG. 2 depicts a computing device to implement a system for organizing audio data, according to the present disclosure.

FIG. 2 depicts a computing device 200 to implement a system for annotating data. The computing device 200 may include at least one client device such as computing system 202. The computing system 202 may include processor 204 that is operatively connected to a memory unit 208. The processor 204 may include one or more integrated circuits that implement the functionality of a central processing unit (CPU) 206. The CPU 206 may be a processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning algorithm 210 or algorithm, a training dataset 212 for the machine-learning algorithm 210, raw source data 215.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 330 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the computing device 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The computing device 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The computing device 200 may implement a machine-learning algorithm 210 that is configured to analyze the raw source data 215. The raw source data 215 may include raw or unprocessed sensor data that may be representative of an input dataset for a machine-learning system. The raw source data 215 may include audio, audio segments, video, video segments, images, text-based information, and raw or partially processed sensor data (e.g., radar map of objects). In some embodiments, audio data may be stored a uncompressed audio formats (e.g., WAV, AIFF, AU, PCM, on any appropriate uncompressed audio format), lossless compressed audio format (e.g., FLAC, WavPack, ALAC, or any appropriate lossless format), and lossy compressed audio format (e.g., MP3, AAC, Opus, Vorbis, ATRAC, WMA, or any appropriate lossy compressed audio format). In some examples, the machine-learning algorithm 210 may be a neural network algorithm that is designed to perform a predetermined function. For example, the neural network algorithm may be configured to determine when an audio signal is an industrial environment is anomalous.

The computer device 200 may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data, such as audio data, that has corresponding outcomes or results that the machine-learning algorithm 210 tries to duplicate via the learning process. In this example, the training dataset 212 may include source audio with and without pedestrians and corresponding presence and location information. The source videos may include various scenarios in which pedestrians are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., annotations) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), the machine-learning algorithm 210 may be executed using data that is not in the training dataset 212. The trained machine-learning algorithm 210 may be applied to new datasets to generate annotated data.

The machine-learning algorithm 210 may be configured to identify a particular feature in the raw source data 215. The raw source data 215 may include a plurality of instances or input dataset for which annotation results are desired. For example, the machine-learning algorithm 210 may be configured to identify the presence of a pedestrian in audio waveforms and annotate the occurrences. The machine-learning algorithm 210 may be programmed to process the raw source data 215 to identify the presence of the particular features. The machine-learning algorithm 210 may be configured to identify a feature in the raw source data 215 as a predetermined feature (e.g., pedestrian). The raw source data 215 may be derived from a variety of sources. For example, the raw source data 215 may be actual input data collected by a machine-learning system. The raw source data 215 may be machine generated for testing the system. As an example, the raw source data 215 may include raw audio data from a microphone.

In the example, the machine-learning algorithm 210 may process raw source data 215 and output an indication of a representation of a sound. The output may also include augmented representation of the sound. A machine-learning algorithm 210 may generate a confidence level or factor for each output generated. For example, a confidence value that exceeds a predetermined high-confidence threshold may indicate that the machine-learning algorithm 210 is confident that the identified feature corresponds to the particular feature. A confidence value that is less than a low-confidence threshold may indicate that the machine-learning algorithm 210 has some uncertainty that the particular feature is present.

Figure 3:
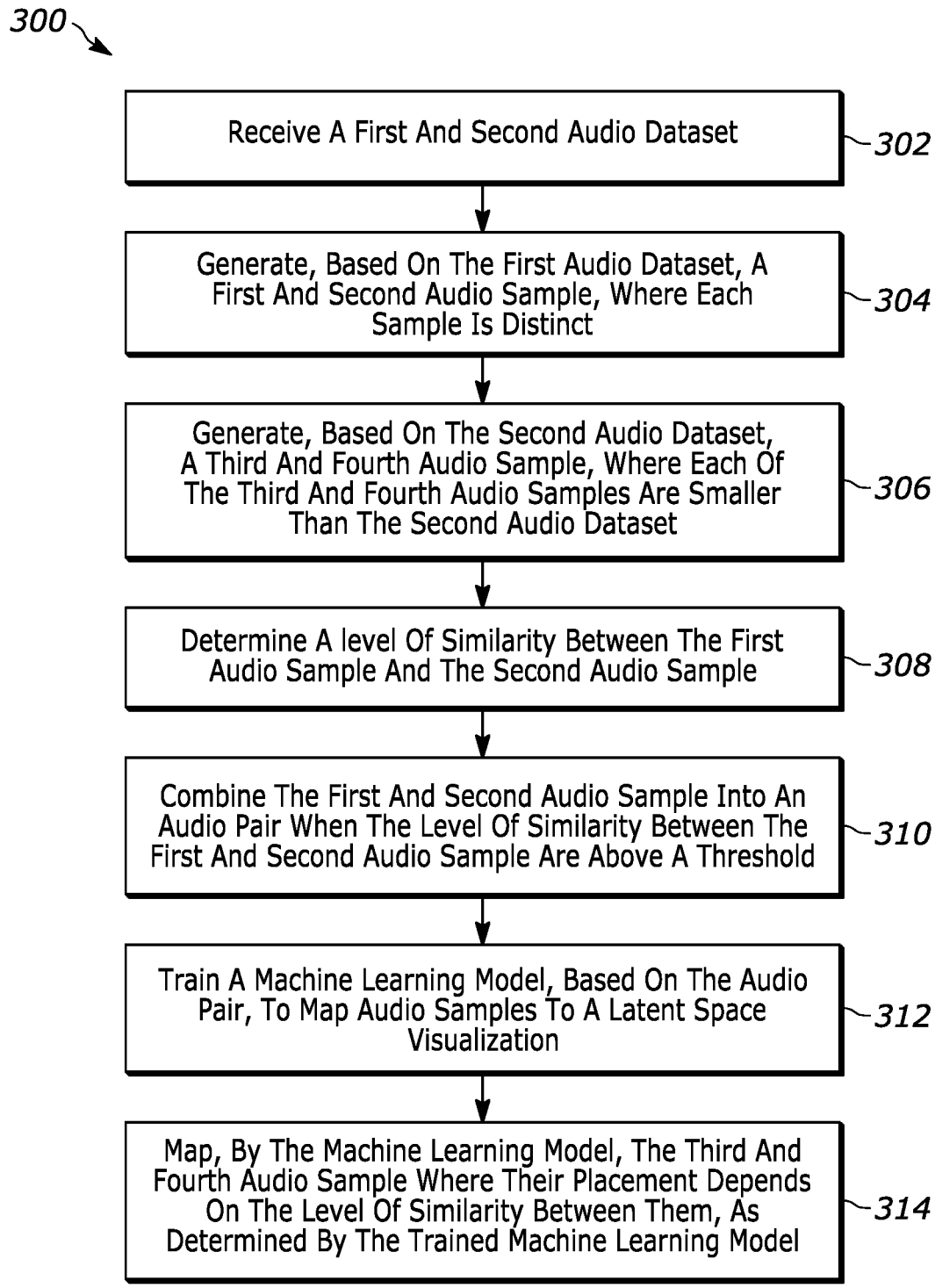
FIG. 3 is a flow chart of a process, illustrating an example embodiment of an audio anomaly detection framework which may be trained using only unlabeled audio recordings, according to the present disclosure.

FIG. 3 is a flow chart of a process 300, illustrating an example embodiment of an audio anomaly detection framework which may be trained using only unlabeled audio recordings according to the present disclosure. According to an example embodiment, one or more process blocks of process 300 may be performed by the processor 204 of computing device 200.

As shown in FIG. 3, process 300 may include receiving, from a microphone, a first audio dataset and a second audio dataset (block 302). For example, the computing device 200 may receive, from a microphone an audio recording from an industrial setting such as a factory or a warehouse. In some embodiments there may be multiple microphones in different locations throughout the industrial setting creating multiple audio datasets simultaneously. In some embodiments the microphones are directly linked to the computing device 200 or they may be linked to other computing devices which then send the audio datasets to the computing device 200 via the network interface device 222. In some embodiments the audio dataset are uniformly generated as having consistent time intervals (e.g., 10 seconds for each audio dataset).

As in addition shown in FIG. 3, process 300 may include generating, based on the first audio dataset, a first audio sample and a second audio sample, where each of the first and second audio samples are smaller than the first audio dataset and the first audio sample is distinct from the second audio sample (block 304). In some embodiments, the computing device 200 may sample a dataset and create two or more samples of audio from distinct portions of a dataset. For example, a 10 second audio dataset may be used to generate two 2 second audio samples, where the first two seconds of the audio dataset are used to create the first sample and the last 2 seconds of the audio sample are used to create the second audio sample.

As also shown in FIG. 3, process 300 may include generating, based on the second audio dataset, a third audio sample and a fourth audio sample, where each of the third and fourth audio samples are smaller than the second audio dataset and the third audio sample is distinct from the fourth audio sample (block 306). In some embodiments, the computing device 200 may sample a dataset and create two or more samples of audio from distinct portions of a dataset. For example, a 10 second audio dataset may be used to generate two 2 second audio samples, where the first two seconds of the audio dataset are used to create the first sample and the last 2 seconds of the audio sample are used to create the second audio sample, as described above.

As further shown in FIG. 3, process 300 may include determining a level of similarity between the first audio sample and the second audio sample (block 308). For example, the computing device 200 may use a similarity measure such as cosine similarity, bilinear similarity, or the inverse of a Minkowski distance to determine a level of similarity between two audio samples. In another embodiments, the similarity may be determined by a pre-trained machine learning model which produces a similarity score between each audio sample. In some embodiments, the process 300 may determine that the two segments taken from the same audio dataset are considered a positive pair, whereas the remaining 2(N−1) datasets are assumed to be negative examples.

As in addition shown in FIG. 3, process 300 may include combining the first audio sample and the second audio sample into an audio pair in response to the level of similarity between the first audio sample and the second audio sample being above a first predetermined threshold (block 310). In some embodiment, the process 300 generates a similarity score between two or more audio samples. The similarity score may be compared against a threshold in order to determine whether they are sufficiently similar to be considered a positive pair. For example, the process 300 may determine that the two segments taken from the same audio dataset are considered a positive pair, whereas the remaining datasets are assumed to be negative examples, as described above.

As also shown in FIG. 3, process 300 may include training a machine learning model, based on the audio pair, to map audio samples to a latent space visualization in view of time and the similarities between the first audio sample and the second audio sample to yield a trained machine learning model (block 312). In particular, the systems and methods described herein may train a machine learning model via backpropagation using a self-supervised contrastive learning objective, as described above. The process 300 may be configured to feed each pair to a machine learning model in order to extract the corresponding representations. In this way, the process 300 may train the machine learning model defined on the embeddings $z_1, \ldots z_{2N}$ (or possibly nonlinear projection thereof):

$$\mathcal{L}_{NT-Xent} = -\frac{1}{N} \sum_{i,j} \log \frac{\exp(sim(z_i, z_j)/\tau)}{\sum_{l=1}^{2N} \mathbb{1}_{[l \neq i]} \exp(sim(z_i, z_l)/\tau)}$$

Where {i, j} may be the indices of a positive pair. $\mathbb{1}_{[l \neq i]}$ may be an indicator function that may be zero when l=i and one otherwise, as described above.

As further shown in FIG. 3, process 300 may include mapping, by the trained machine learning model, in the latent space visualization, the third audio sample and the fourth audio sample where placement of the third audio sample and the fourth audio sample depends on the level of similarity of the third audio sample and the fourth audio sample, as determined by the trained machine learning model (block 314). In some embodiments, the machine learning model may map vector value representations of the audio clips in clusters based on their level of similarity which forms non-semantic clusters in the latent space without requiring human supervision. The representations may be clustered through one of the following clustering approaches: centroid-based methods (such as K-Means), distribution-based methods (such as Gaussian Mixture Models), hierarchical methods (such as linkage-based algorithms), or any other appropriate clustering approach. In some embodiments, the process 300 may favor density-based approaches (e.g., DBSCAN, OPTICS, or any other appropriate density based clustering approaches) which may not require a pre-defined number of clusters K in advance.

It should be noted that while FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
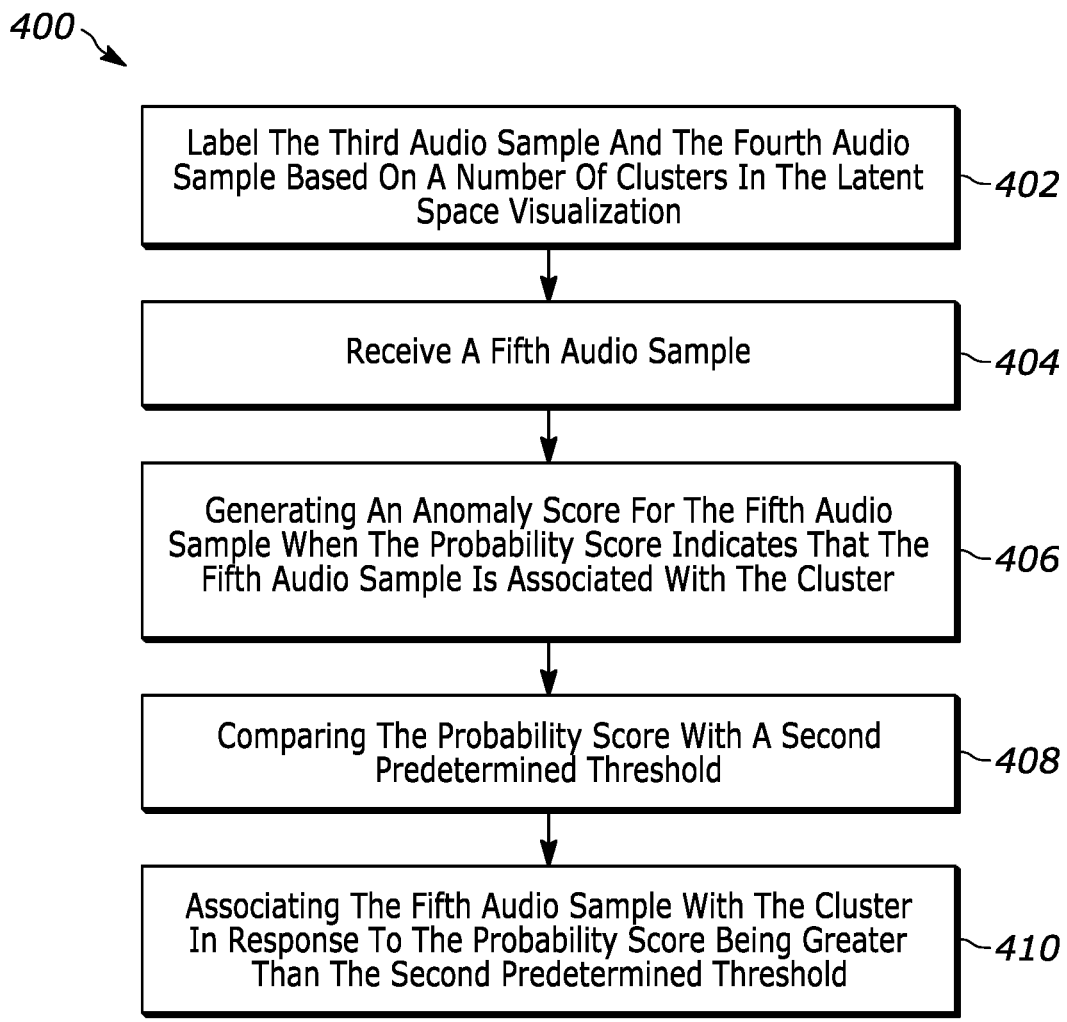
FIG. 4 is a flowchart of a process, illustrating an example embodiment of an audio anomaly detection framework while in operation, according to the present disclosure.

FIG. 4 is a flowchart of a process 400, illustrating an example embodiment of an audio anomaly detection framework while in operation according to the present disclosure. According to an example embodiment, one or more process blocks of process 400 may be performed by the processor 204 of computing device 200.

As shown in FIG. 4, process 400 may include labeling the third audio sample and the fourth audio sample based on a number of clusters in the latent space visualization (block 402). In some embodiments, the latent space visualization may contain multiple clusters, when an audio sample is placed in proximity to an existing cluster, that audio sample will be labeled based on the label of the cluster. In some embodiments, the clusters may be numbered and the associated labels of audio samples in that cluster will mirror the number associated with the cluster. In some embodiments, each cluster in the latent visual space may be labeled based on some shared attribute of the audio samples associated with that cluster.

As also shown in FIG. 4, process 400 may include receiving a fifth audio sample (block 404). For example, device may receive an audio sample from a microphone which records and send audio in real time to the computing device 200. In some embodiments, the audio sample may be recorded by a microphone and stored at a remote device which may transmit the recording to the computing device 200 via the network interface device 222.

As further shown in FIG. 4, process 400 may include generating the probability score for the fifth audio sample where the probability score indicates a probability that the fifth audio sample is associated with the cluster (block 406). In some embodiments, a second machine learning model generates the probability score which is computed as $$A(x) = \log \frac{1 - p_k(x)}{p_k(x)}$$

where $p_k(x)$ is the probability of sample x belonging to the kth cluster as predicted by the second machine learning model, where k is the cluster index associated to x by the density-based clustering algorithm as described above. Samples with a value of $A(x)$ greater than the second threshold may be identified as anomalous (block 408).

As further shown in FIG. 4, process 400 may include associating the fifth audio sample with the cluster in response to the probability score being greater than the second predetermined threshold (block 410). In some embodiments, this may include mapping a vector representation of the fifth audio sample to the latent visualization space in close proximity to the cluster. In some embodiments, the fifth audio sample may be labeled based on one or more labels associated with the cluster.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
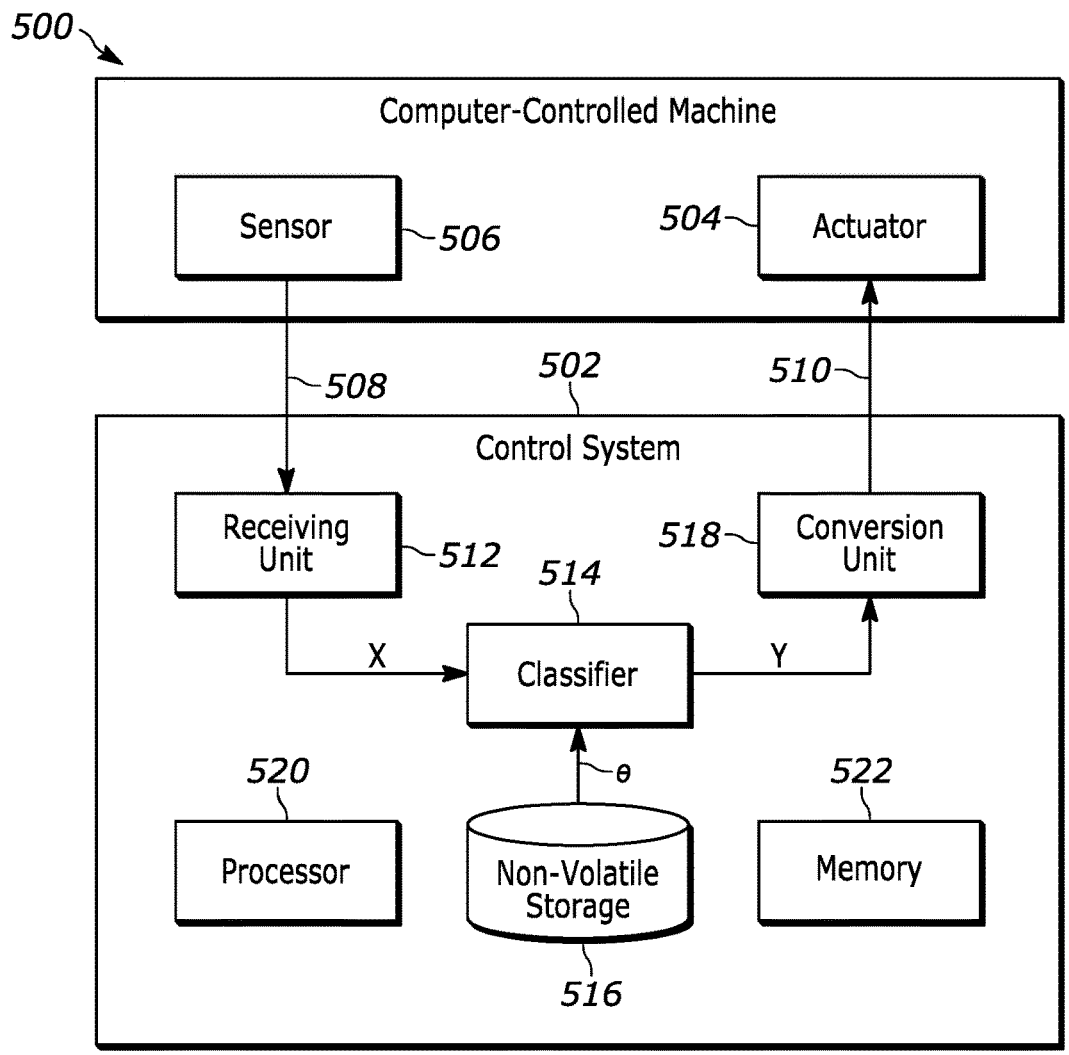
FIG. 5 depicts a schematic diagram of an interaction between computer-controlled machine and control system, according to the present disclosure.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to the computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. For example, sensor 506 may be one or more microphones which may transform sounds into waveforms which may be stored as digital data. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to a sound recorded by sensor 506.

Control system 502 includes classifier 514. Classifier 514 may be configured to classify input signals x into one or more labels using a machine-learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506, which may be an audio sensor such as one or more microphones. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause the control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
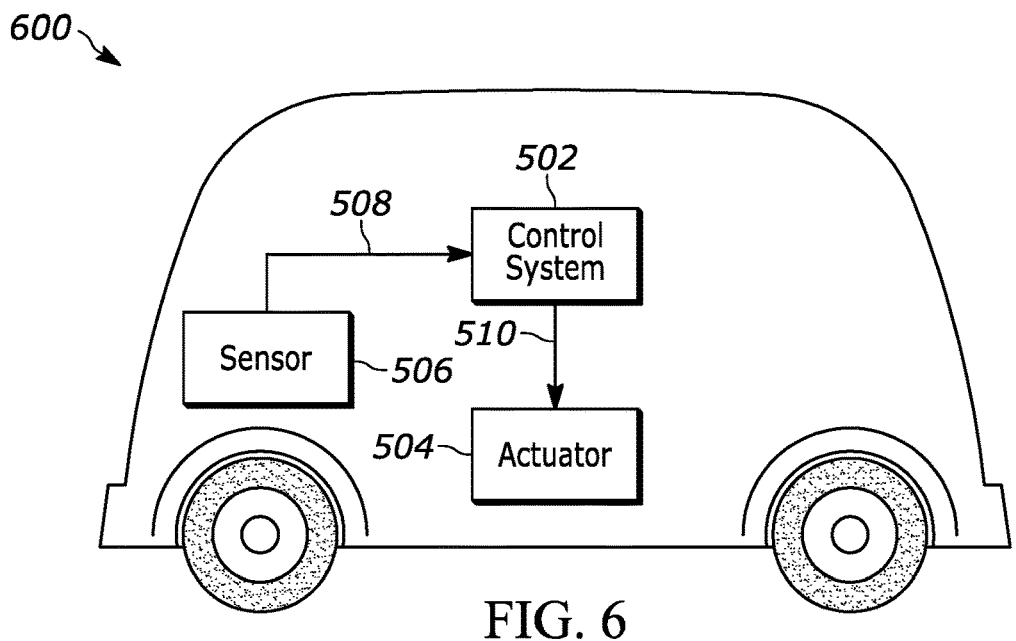
FIG. 6 depicts a schematic diagram of control system configured to control vehicle, which may be an at least partially autonomous vehicle or an at least partially autonomous robot, according to the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more microphones. One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on audio signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or other vehicles. The actuator control commands 510 may be determined depending on the classification. In a scenario where an adversarial attack may occur, the system described above may be further trained to better detect objects.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an audio sensor configured to detect an anomaly related to the state of an object which is to undergo processing by the household appliance. For example, in the case of the domestic appliance being a washing machine, sensor 506 may detect an anomalous sound related to the state of the laundry inside the washing machine. Actuator control command 510 may be determined based on the detected anomalous sound.

Figure 7:
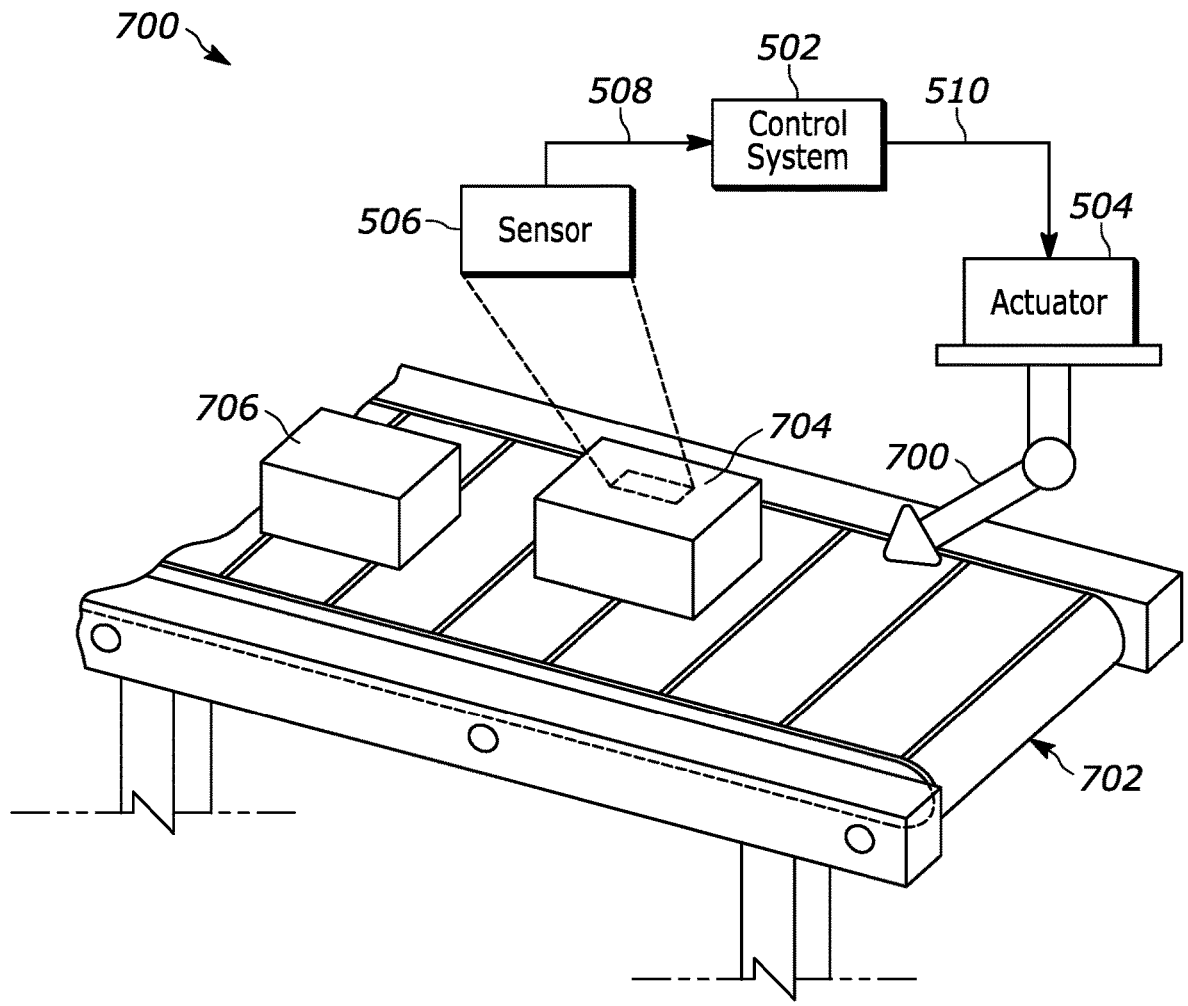
FIG. 7 depicts a schematic diagram of control system, according to the present disclosure

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of control system 700 (e.g., manufacturing machine) may be a microphone configured to capture one or more audible properties of manufactured product 704, such as a change in sound as the operation of the manufacturing machine. Classifier 514 may be configured to determine a state of manufactured product 704 from one or more of the captured properties. For example, one or more microphones may be used to record audio produced by the manufacturing machine. The recorded audio may be analyzed by a trained machine learning model to detect audio indicating an anomalous state of the manufacturing machine.

Actuator 504 may be configured to control system 700 (e.g., manufacturing machine) depending on the determined state of manufactured product 704 for a subsequent manufacturing step of manufactured product 704. The actuator 504 may be configured to control functions of control system 700 (e.g., manufacturing machine) on subsequent manufactured product 706 of control system 700 (e.g., manufacturing machine) depending on the determined state of manufactured product 704.

Figure 8:
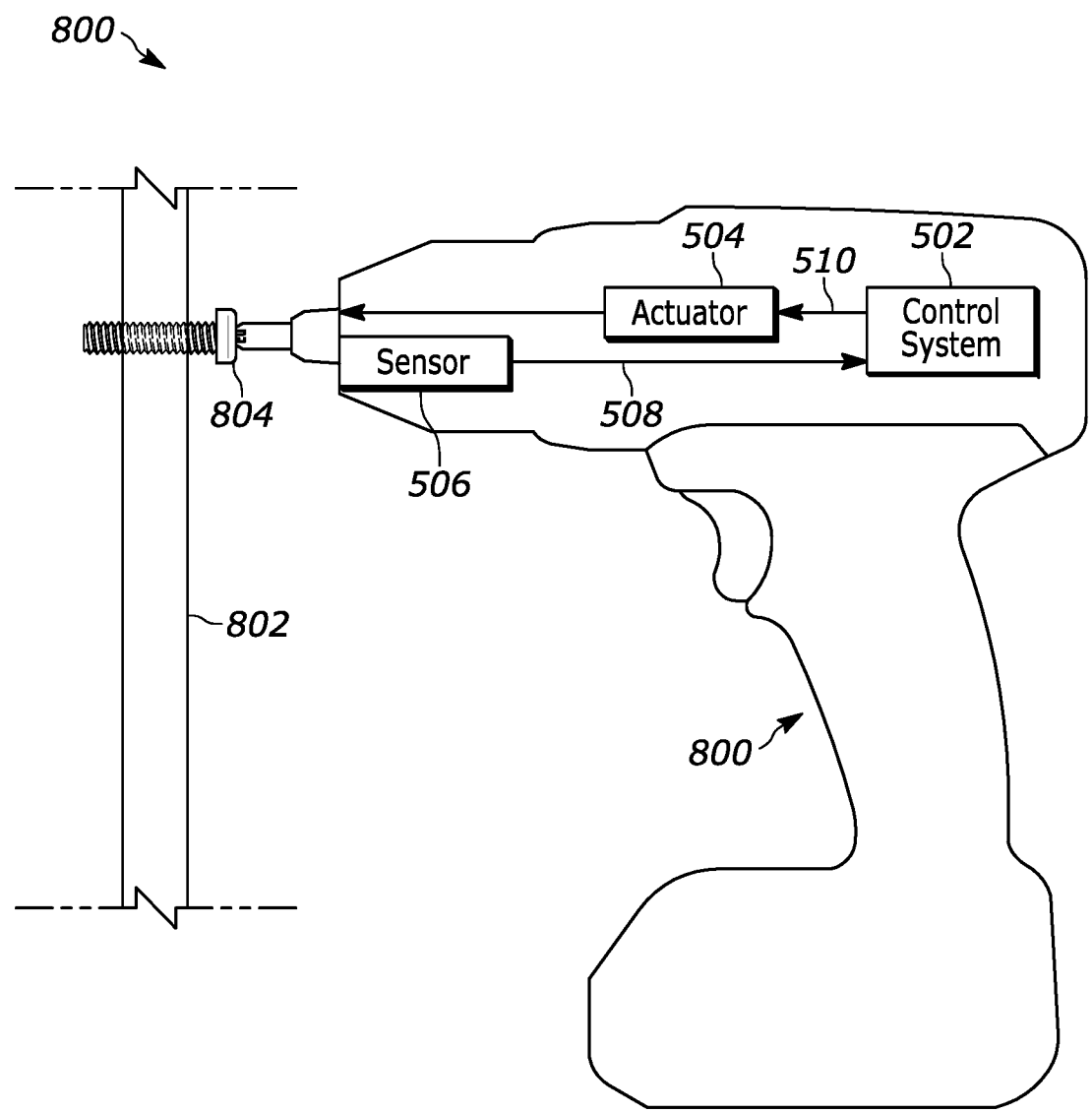
FIG. 8 depicts a schematic diagram of control system configured to detect an anomaly for a control power tool, such as a power drill or driver, according to the present disclosure.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of control power tool 800 may be a microphone configured to capture one or more audible properties of work surface 802 and/or fastener 804 being driven into work surface 802. In some embodiments, a machine learning model may be trained to determine when an audible property received by one or more microphones indicates an anomalous state of the power tool. Classifier 514 may be configured to determine a state of work surface 802 and/or fastener 804 relative to work surface 802 from one or more of the captured audible properties. The state may be fastener 804 being flush with work surface 802. The state may alternatively be hardness of work surface 802. Actuator 504 may be configured to control power tool 800 such that the driving function of control power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
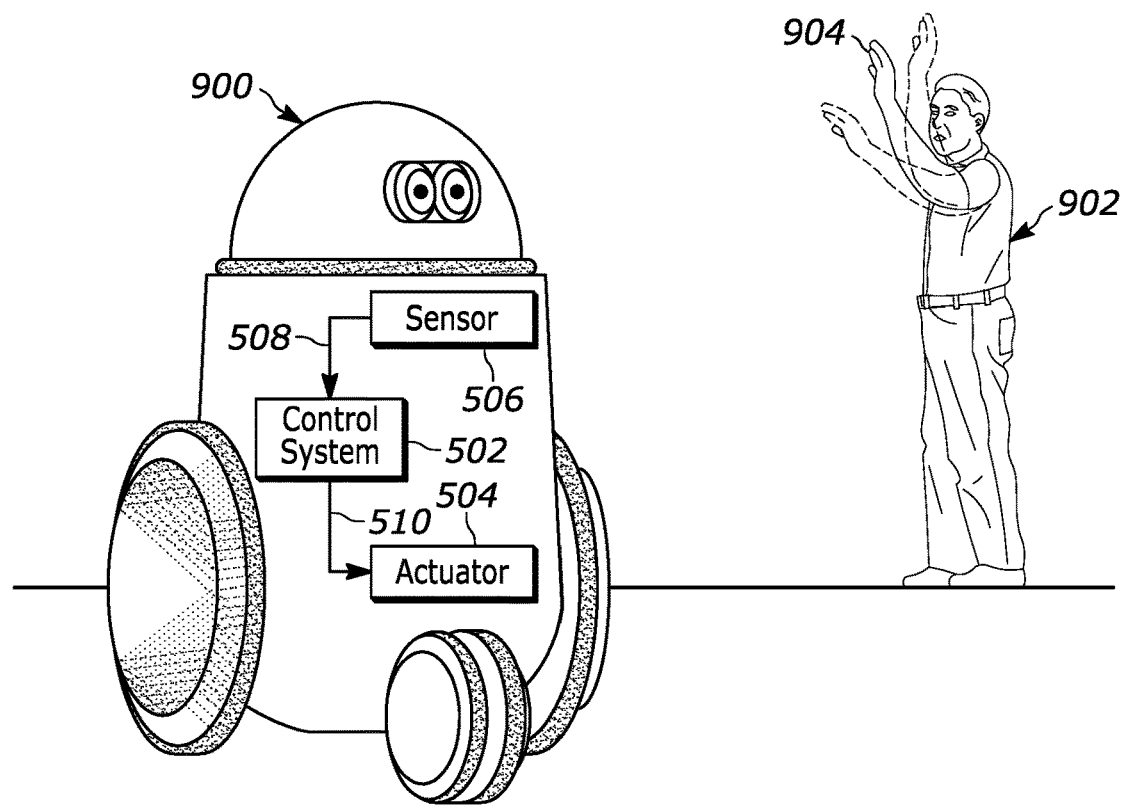
FIG. 9 depicts a schematic diagram of control system configured to detect an anomaly for an automated personal assistant, according to the present disclosure.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an audio sensor and/or an optical sensor. The audio sensor may be configured to receive a voice command of user 902. The optical sensor may be configured to receive video images of gestures 904 of user 902.

Control system 502 of automated personal assistant 900 may be configured to determine actuator control commands 510 configured to control system 502. Control system 502 may be configured to determine actuator control commands 510 in accordance with sensor signals 508 of sensor 506 and determine anomalous audio via analysis by a trained machine learning model. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
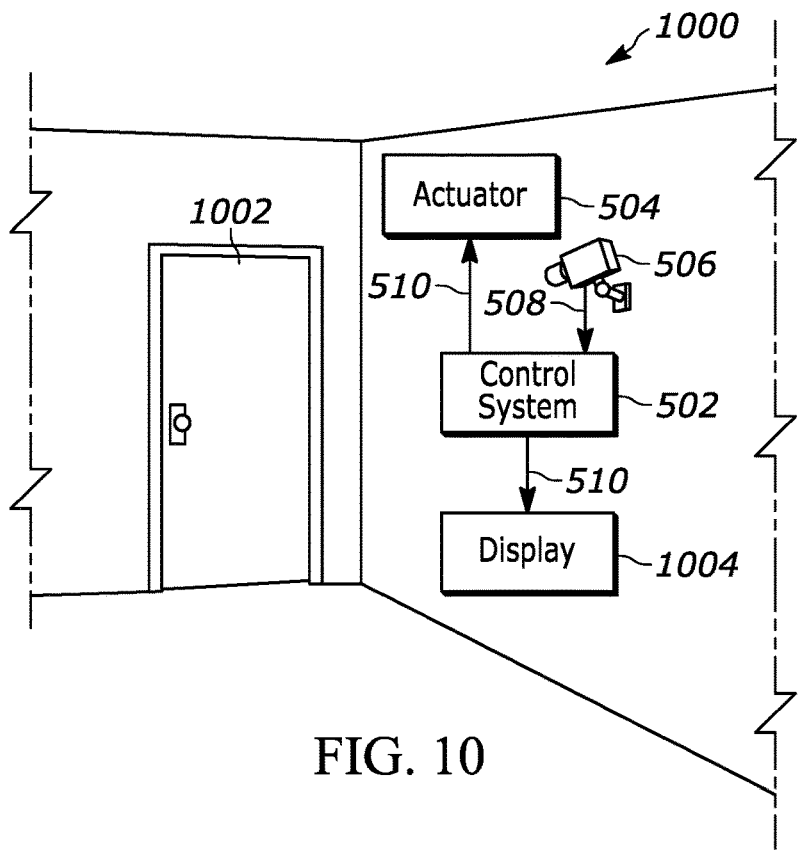
FIG. 10 depicts a schematic diagram of control system configured to detect an anomaly for a monitoring system, according to the present disclosure.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be one or more microphones configured to generate and transmit audio data. Such data may be used by control system 502 to detect a sound, such as an authorized user entering the area or at an unauthorized time.

Classifier 514 of control system 502 of monitoring system 1000 may be configured to interpret the audio, image, and/or video data by matching identities of known people stored in non-volatile storage 516, thereby determining an identity of a person. Classifier 514 may be configured to generate and an actuator control command 510 in response to the interpretation of the audio, image, and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be a microphone configured to detect sound of a scene that is under surveillance and control system 502 is configured to control display 1004. Classifier 514 is configured to determine a classification of a scene, e.g. whether the audio signal detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight a sound that is deemed suspicious by classifier 514. Utilizing an embodiment of the system disclosed, the surveillance system may predict objects at certain times in the future showing up.

Figure 11:
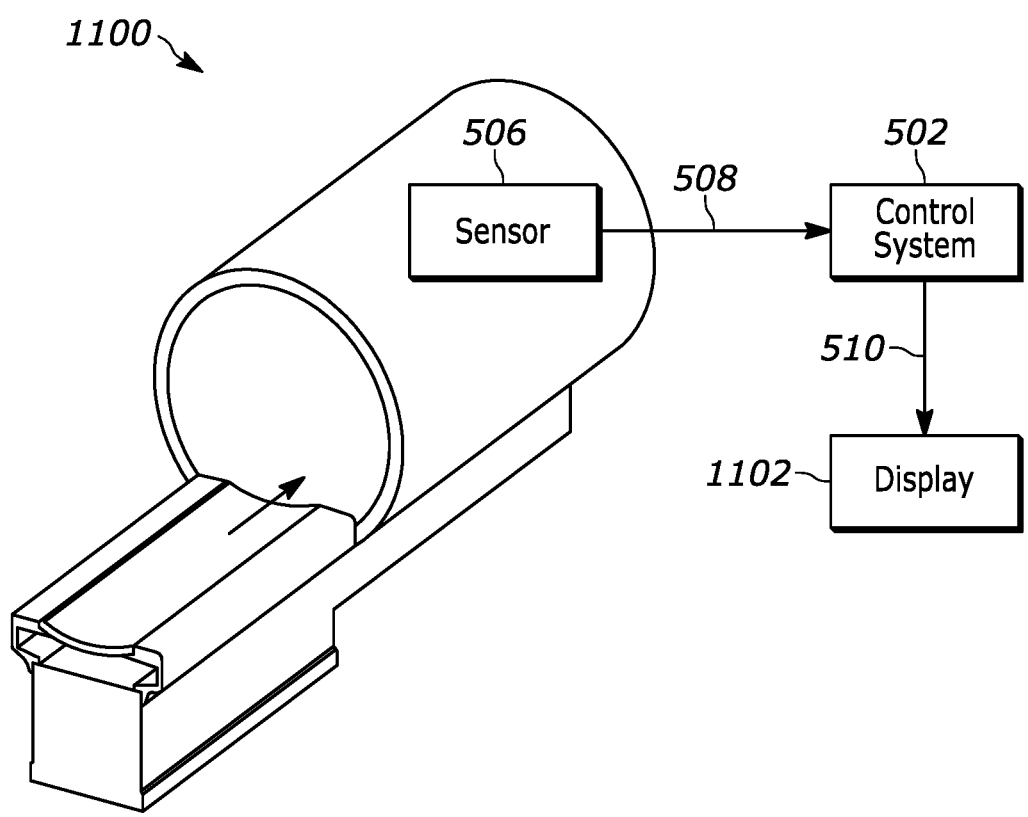
FIG. 11 depicts a schematic diagram of control system configured to detect an anomaly for an imaging system, for example an MRI apparatus, x-ray imaging apparatus or ultrasonic apparatus, according to the present disclosure.

FIG. 11 depicts a schematic diagram of control system 502 configured to control imaging system 1100, for example an MRI apparatus, x-ray imaging apparatus or ultrasonic apparatus. Sensor 506 may, for example, be an audio sensor. Classifier 514 may be trained machine learning model configured to determine an anomaly classification of all or part of the sensed audio recording. Classifier 514 may be configured to determine or select an actuator control command 510 in response to the classification obtained by the trained neural network. For example, classifier 514 may interpret a time period of a sensed audio to be potentially anomalous. In this case, actuator control command 510 may be determined or selected to cause display 1102 to display the imaging and highlighting the potentially anomalous time period.

In some embodiments, a method for labeling audio data includes receiving, from at least one camera and microphone, video stream data associated with a data capture environment. The method also includes receiving, from at least one audio capturing array, audio stream data that corresponds to at least a portion of the video stream data. The method also includes labeling, using output from at least a first machine-learning model configured to provide output including one or more object detection predictions, at least some objects of the video stream data. The method also includes calculating, based on at least one data capturing characteristic, at least one offset value for at least a portion of the audio stream data that corresponds to at least one labeled object of the video stream data and synchronizing, using at least the at least one offset value, at least a portion of the video stream data with the portion of the audio stream data that corresponds to the at least one labeled object of the video stream data. The method also includes labeling, using one or more labels of the labeled objects of the video stream data and the at least one offset value, at least the portion of the audio stream data that corresponds to the at least one labeled object of the video stream data. The method also includes generating training data using at least some of the labeled portion of the audio stream data and training a second machine-learning model using the training data.

In some embodiments, the at least one audio capturing array includes a plurality of audio capturing devices. In some embodiments, the at least one audio capturing array is remotely located from the at least one image capturing device. In some embodiments, labeling, using the output from at least the first machine-learning model, the at least some objects of the video stream data includes labeling the at least some objects of the video stream data with at least an event type, an event start indicator, and an event end indicator. In some embodiments, the at least one data capturing characteristic includes one or more characteristics of the at least one image capturing device. In some embodiments, the at least one data capturing characteristic includes one or more characteristics of the at least one audio capturing array. In some embodiments, the at least one data capturing characteristic includes one or more characteristics corresponding to a location of the at least one image capturing device relative to the at least one audio capturing array. In some embodiments, the at least one data capturing characteristic includes one or more characteristics corresponding to a movement of an object in the video stream data. In some embodiments, calculating, based on the at least one data capturing characteristic, the at least one offset value for the at least a portion of the audio stream data that corresponds to the at least one labeled object of the video stream data includes using at least one probabilistic-based function.

Figure 12:
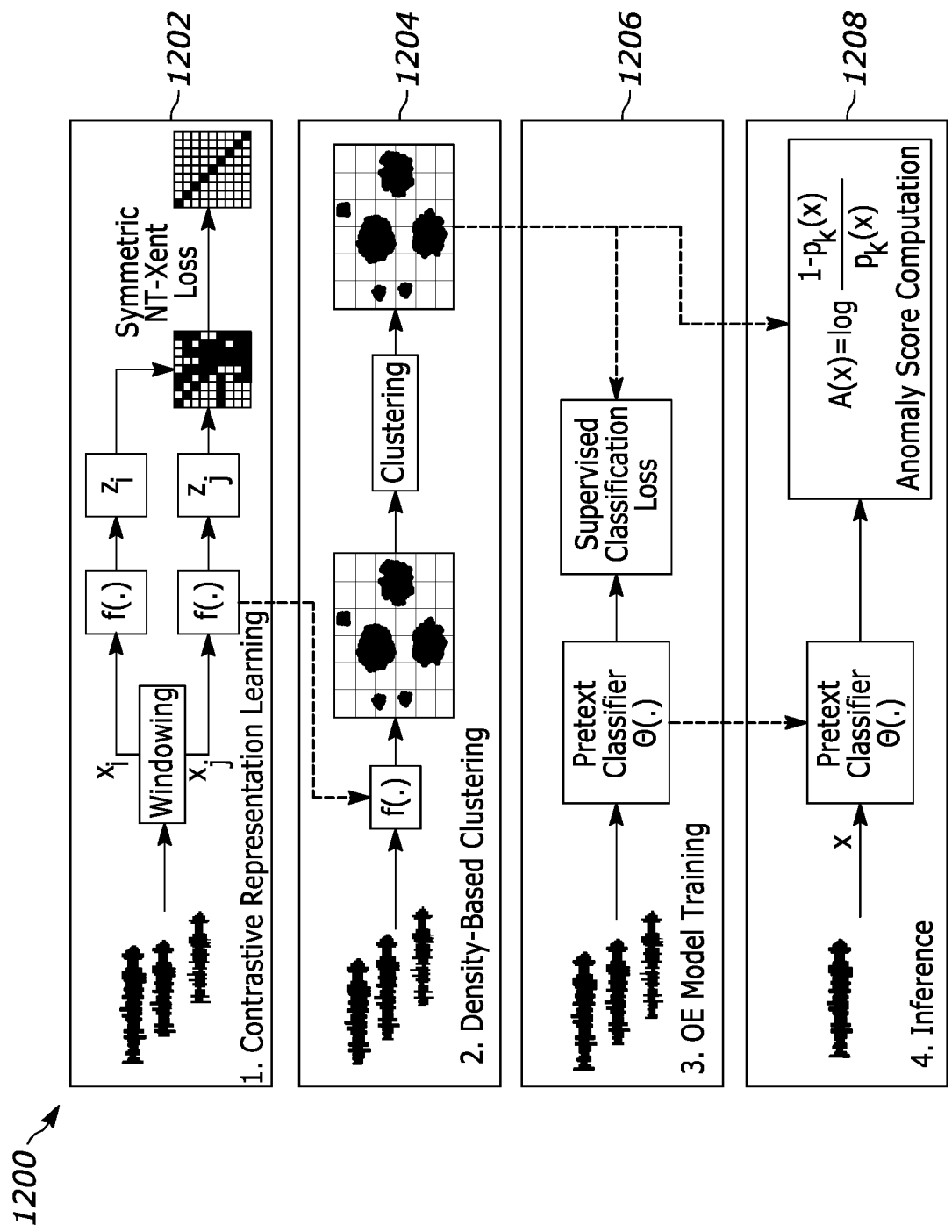
FIG. 12 depicts a flow diagram of process which illustrates an example overview of anomaly score computation based on the present disclosure.

FIG. 12 depicts a flow diagram of process 1200 which illustrates an example overview of anomaly score computation based on the present disclosure. The process 1200 may executed by processor 204 on computing device 200. To start the process 1200, the processor 204 may receive raw audio data (e.g., raw source data 216) from one or more microphones.

At 1202, the process 1200 select N fixed-length context windows in which the systems and methods described herein may assume temporal invariance for the unknown attributes. The process 1200 may randomly sample two audio segments (e.g., $x_i$, $x_j$) from within each context window, resulting in a batch of 2N audio clips. The sampling may be performed in the time domain by segmenting raw waveforms. In some embodiments, the two segments taken from the same context window are considered a positive pair, whereas the remaining 2(N−1) segments are assumed to be negative examples. The process 1200 may feed each pair to f(•) in order to extract the corresponding representations. In this way, the systems and methods described herein may optimize the following contrastive loss function defined on the embeddings $z_1, \ldots z_{2N}$ (or possibly nonlinear projection thereof):

$$\mathcal{L}_{NT-Xent} = -\frac{1}{N}\sum_{i,j}\log\frac{\exp(sim(z_i, z_j)/\tau)}{\sum_{l=1}^{2N}\mathbb{1}_{[l\neq i]}\exp(sim(z_i, z_l)/\tau)}$$

where {i, j} may be the indices of a positive pair. $\mathbb{1}_{[l\neq i]}$ may be an indicator function that may be zero when l=i and one otherwise. Sim (•, •) may be a similarity measure such as cosine similarity, bilinear similarity, or the inverse of a Minkowski distance, and is the softmax temperature controlling the entropy of the logits. The process 1200 may optimize along with the neural network parameters to avoid manual tuning.

At 1204, the process 1200 may, after the pre-training of f(•) is completed, utilize vector-valued representations ($z_i$, $z_j$) of audio clips exhibiting similar acoustic features which may form non-semantic clusters in the latent space without requiring human supervision. The representations may be clustered through one of the following clustering approaches: centroid-based methods (such as K-Means), distribution-based methods (such as Gaussian Mixture Models), hierarchical methods (such as linkage-based algorithms), or any other appropriate clustering approach. However, these clustering concepts typically entail an ad-hoc interaction with a human expert and/or a prior assumptions regarding the target data distribution. Therefore, the process 1200 may utilize density-based approaches (e.g., DBSCAN, OPTICS, or any other appropriate density based clustering approaches) which may not require a pre-defined number of clusters K in advance, may involve minimal hyper-parameter tuning, and may allow for arbitrary-shaped latent distributions.

The process 1200 may view corresponding cluster indices as annotations of emerging pseudo-attributes, and may be used for various downstream tasks, including, but not limited to, pretext attribute classification. The process 1200 may result in a fully unsupervised pseudo-attribute discovery pipeline that may assign, to each audio clip in a dataset, the corresponding cluster index, where K is the total number of clusters identified by the systems and methods described herein.

At 1206, the process 1200 may regard cluster labels as pseudo-attributes in downstream pretext classification tasks. The pretext classifier Θ(•) may be a neural network of choice that given an audio sample at the input, predicts the probability of such sample belonging to each of the K clusters predicted above. Such a neural network may be trained via backpropagation with a cross-entropy loss, or any suitable supervised classification loss function.

At 1208, the process 1200 nay, at inference time, utilize audio sample x which may be fed into $\Theta(\bullet)$ and the anomaly score for the sample may be computed as:

$$A(x) = \log \frac{1 - p_k(x)}{p_k(x)}$$

where $p_k(x)$ is the probability of sample x belonging to the kth cluster as predicted by $\Theta(\bullet)$, where k is the cluster index associated to x by the density-based clustering algorithm as described above. Samples with a value of $A(x)$ greater than an application-specified threshold may be identified as anomalous.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The invention claimed is:

1. A computer-implemented method for detecting an anomaly in audio data, comprising:
   receiving, from a microphone, a first audio dataset and a second audio dataset;
   generating, based on the first audio dataset, a first audio sample and a second audio sample, where each of the first and second audio samples are smaller than the first audio dataset and the first audio sample is distinct from the second audio sample, wherein the generating is conducted by sampling in a time domain by segmenting raw waveforms of the first audio sample and second audio sample;
   generating, based on the second audio dataset, a third audio sample and a fourth audio sample, where each of the third and fourth audio samples are smaller than the second audio dataset and the third audio sample is distinct from the fourth audio sample, wherein the generating is conducted by sampling in a time domain by segmenting raw waveforms;
   determining a level of similarity between the first audio sample and the second audio sample utilizing a pretext classifier that includes a neural network configured to predict a probability of one of the audio samples belonging to an associated cluster in response to identifying an anomaly score;
   combining the first audio sample and the second audio sample into an audio pair in response to the level of similarity between the first audio sample and the second audio sample being above a first predetermined threshold;
   training a machine learning model, based on the audio pair, to map audio samples to a latent space visualization in view of time and the similarities between the first audio sample and the second audio sample to yield a trained machine learning model; and
   mapping, by the trained machine learning model, in the latent space visualization, the third audio sample and the fourth audio sample where placement of the third audio sample and the fourth audio sample depends on the level of similarity of the third audio sample and the fourth audio sample, as determined by the trained machine learning model.

2. A computer-implemented method of claim 1, comprising:
   labeling the third audio sample and the fourth audio sample based on a number of clusters in the latent space visualization.

3. A computer-implemented method of claim 2, comprising:
   receiving a fifth audio sample;
   generating a probability score for the fifth audio sample wherein the probability score indicates a probability that the fifth audio sample is associated with the cluster;
   comparing the probability score with a second predetermined threshold; and
   associating the fifth audio sample with the cluster in response to the probability score being greater than the second predetermined threshold.

4. The computer-implemented method of claim 1, wherein the first audio sample and the second audio sample do not overlap in view of the first audio dataset.

5. The computer-implemented method of claim 1, wherein the training of the machine learning model is performed via a self-supervised contrastive learning objectives.

6. The computer-implemented method of claim 1, wherein the first audio dataset and the second audio dataset do not include human annotations.

7. The computer-implemented method of claim 1, wherein the mapping of the third audio sample and the fourth audio sample in the latent space visualization creates a cluster and the method further comprising:
   determining a shared attribute between the third audio sample and the fourth audio sample; and
   labeling the cluster based on the shared attributes of the third audio sample and the fourth audio sample.

8. A system for detecting an anomaly in audio data comprising:
   one or more processors configured to:
   receive, from a microphone, a first audio dataset and a second audio dataset;
   generate, based on the first audio dataset, a first audio sample and a second audio sample, where each of the first and second audio samples are smaller than the first audio dataset and the first audio sample is distinct from the second audio sample, wherein the generating is conducted by sampling in a time domain by segmenting raw waveforms of the first audio sample and second audio sample;

generate, based on the second audio dataset, a third audio sample and a fourth audio sample, where each of the third and fourth audio samples are smaller than the second audio dataset and the third audio sample is distinct from the fourth audio sample, wherein the generating is conducted by sampling in a time domain by segmenting raw waveforms;

determine a level of similarity between the first audio sample and the second audio sample utilizing a pretext classifier that includes a neural network configured to predict a probability of one of the audio samples belonging to an associated cluster in response to identifying an anomaly score;

combine the first audio sample and the second audio sample into an audio pair in response to the level of similarity between the first audio sample and the second audio sample being above a first predetermined threshold;

train a machine learning model, based on the audio pair, to map audio samples to a latent space visualization in view of time and the similarities between the first audio sample and the second audio sample to yield a trained machine learning model; and map, by the trained machine learning model, in the latent space visualization, the third audio sample and the fourth audio sample where placement of the third audio sample and the fourth audio sample depends on the level of similarity of the third audio sample and the fourth audio sample, as determined by the trained machine learning model.

9. The system of claim 8, wherein the mapping of the third audio sample and the fourth audio sample in the latent space visualization creates a cluster and the one or more processors, are further configured to:
   label the third audio sample and the fourth audio sample based on a number of clusters in the latent space visualization.

10. The system of claim 9, wherein the one or more processors are further configured to:
   receive a fifth audio sample;
   generate a probability score for the fifth audio sample wherein the probability score indicates a probability that the fifth audio sample is associated with the cluster;
   compare the probability score with a second predetermined threshold; and
   associate the fifth audio sample with the cluster in response to the probability score being greater than the second predetermined threshold.

11. The system of claim 8, wherein the first audio sample and the second audio sample do not overlap in view of the first audio dataset.

12. The system of claim 8, wherein the training of the machine learning model is performed via a self-supervised contrastive learning objectives.

13. The system of claim 8, wherein the first audio dataset and the second audio dataset do not include human annotations.

14. The system of claim 8, wherein the mapping of the third audio sample and the fourth audio sample in the latent space visualization creates a cluster and the one or more processors, are further configured to:
   determine a shared attribute between the third audio sample and the fourth audio sample; and
   label the cluster based on the shared attributes of the third audio sample and the fourth audio sample.

15. A non-transitory computer-readable medium storing a set of instructions for detecting an anomaly in audio data, the set of instructions comprising:
   one or more instructions that, when executed by one or more processors of a device, cause the device to:
   receive, from a microphone, a first audio dataset and a second audio dataset;
   generate, based on the first audio dataset, a first audio sample and a second audio sample, where each of the first and second audio samples are smaller than the first audio dataset and the first audio sample is distinct from the second audio sample, wherein the instructions to generate is conducted by sampling in a time domain by segmenting raw waveforms of the first audio sample and second audio sample;
   generate, based on the second audio dataset, a third audio sample and a fourth audio sample, where each of the third and fourth audio samples are smaller than the second audio dataset and the third audio sample is distinct from the fourth audio sample, wherein the instructions to generate is conducted by sampling in a time domain by segmenting raw waveforms;
   determine a level of similarity between the first audio sample and the second audio sample utilizing a pretext classifier that includes a neural network configured to predict a probability of one of the audio samples belonging to an associated cluster in response to identifying an anomaly score;
   combine the first audio sample and the second audio sample into an audio pair in response to the level of similarity between the first audio sample and the second audio sample being above a first predetermined threshold;
   train a machine learning model, based on the audio pair, to map audio samples to a latent space visualization in view of time and the similarities between the first audio sample and the second audio sample to yield a trained machine learning model; and
   map, by the trained machine learning model, in the latent space visualization, the third audio sample and the fourth audio sample where placement of the third audio sample and the fourth audio sample depends on the level of similarity of the third audio sample and the fourth audio sample, as determined by the trained machine learning model.

16. The non-transitory computer-readable medium of claim 15, wherein the mapping of the third audio sample and the fourth audio sample in the latent space visualization creates a cluster and the one or more instructions further comprises:
   labeling the third audio sample and the fourth audio sample based on a number of clusters in the latent space visualization.

17. The non-transitory computer-readable medium of claim 16, the set of instructions further comprising:
   receiving a fifth audio sample;
   generating a probability score for the fifth audio sample wherein the probability score indicates a probability that the fifth audio sample is associated with the cluster;
   comparing the probability score with a second predetermined threshold; and
   associating the fifth audio sample with the cluster in response to the probability score being greater than the second predetermined threshold.

18. The non-transitory computer-readable medium of claim 15, wherein the training of the machine learning model is performed via a self-supervised contrastive learning objectives.

19. The non-transitory computer-readable medium of claim 15, wherein the first audio dataset and the second audio dataset do not include human annotations.

20. The non-transitory computer-readable medium of claim 15, wherein the mapping of the third audio sample and the fourth audio sample in the latent space visualization creates a cluster and the one or more instructions further comprises:
   determining a shared attribute between the third audio sample and the fourth audio sample; and
   labeling the cluster based on the shared attributes of the third audio sample and the fourth audio sample.

* * * * *